United States Patent Office 3,337,185
Patented Aug. 22, 1967

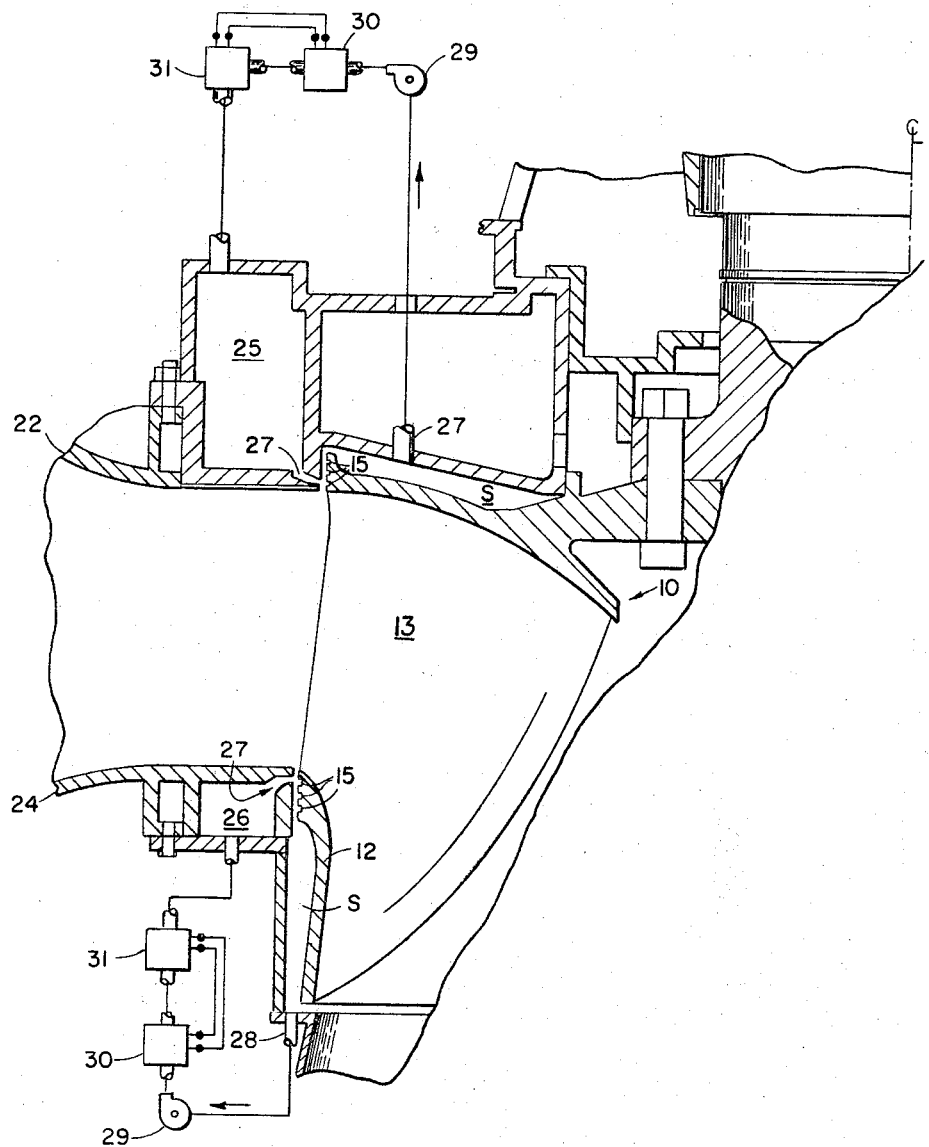

3,337,185
DRAG REDUCTION IN PUMPS AND TURBINES
Robert Stanley Sproule, Montreal, Quebec, Canada, assignor to Dominion Engineering Works, Limited, Lachine, Quebec, Canada
Filed Dec. 29, 1966, Ser. No. 605,923
6 Claims. (Cl. 253—26)

ABSTRACT OF THE DISCLOSURE

The structure of a rotary pump or turbine having a shrouded runner, includes a seal arrangement at the runner high pressure edge with an annular liquid supply manifold adjacent the edge, and a liquid recirculation circuit for collecting low-drag liquid contained in the shroud space surrounding the runner shroud, and re-supplying this low drag liquid to the manifold for recirculation to the seal and the shroud space.

---

This invention is directed to a rotary hydraulic machine such as a turbine, pump, or pump-turbine, and in particular to an improved seal and fluid recirculation arrangement.

In my copending application Ser. No. 555,582 certain arrangements of turbine seals are provided, in conjuction with circulation systems for utilizing fluid additives possessed of low drag characteristic, such as that trademarked "Polyox," being a poly(ethylene oxide) of large molecular structure. As taught in the above-identified copending application, this substance when used at the prescribed concentration provides a significant reduction in fluid drag, over a particular range of Reynolds number which can be readily determined.

The present invention provides an additional seal and fluid recirculation arrangement for use with a pump or a turbine of the Francis type, the seal being located adjacent the high pressure edge of the turbine shroud.

Certain embodiments of the present invention are described by way of example, reference being had to the accompanying drawing, which shows a cross-section view of a portion of a hydraulic machine of the type described incorporating an upper seal and a lower seal and their associated fluid recirculation circuits.

The figure illustrates a portion of the periphery of a Francis turbine, having the centre line of the runner main axis as indicated. The turbine runner 10 has an annular crown or upper shroud 11 and a lower or skirt shroud 12, with a plurality of blades 13 extending therebetween.

The high pressure shroud lip portions 14 include a plurality of annular grooves 15 extending coaxially about the runner main axis, and forming in cooperation with the stationary structure located radially outward thereof relative to the main axis a high pressure gland.

In the upper and lower stationary structure 22, 24, are located chambers 25, 26 respectively. Each chamber 25, 26 is illustrated having an annular outlet 27 in radial facing relation with the outer grooved surface of the shroud high pressure edge.

The upper and lower shroud spaces S, surrounding shrouds 11, 12 are provided with fluid collection means 27, 28 leading to the inlets of pumps 29. Each of the circulation circuits illustrated includes a drag reduction monitoring device 30 for determining the suitability of concentration of drag reducing additive in the circulating fluid, and additive introduction means 31 connected thereto, whereby additional additive can be introduced for recirculation into the additive chambers 25, 26.

Thus it will be seen that the present invention provides a gland and recirculation arrangement particularly adapted to provide efficient utilization of drag reduction additive in a machine such as a Francis turbine having a flow restrictive seal at the high pressure edge portion of the runner shroud.

In operation, the turbine receives the working liquid, water from an annular distributor defined by entry walls 22, 24. The water flows inwardly into the runner 10 and passes downwardly therethrough between the runner blades 13 and into the draft tube.

The low-drag liquid occupying the shroud spaces S is supplied from the annular chambers 25, 26 at a pressure substantially equal to that of the working liquid, so that ingress of the working liquid to the shroud spaces S is substantially prevented.

The flow path of the low-drag liquid into shroud spaces S passes the annular grooves 15 and the adjacent lands, which are provided with small radial clearances from the surrounding portions of the housing, to provide a significant drop in the pressure of the low-drag liquid, so that the pressure in the spaces S approximates that of the working liquid in the draft tube. The low-drag liquid is then removed from the spaces S and recirculated to the annular chambers 25, 26, the effective additive concentration being maintained by the devices 30, 31 as described.

It is further contemplated that the seal arrangement of the present invention may be utilized in pumps for pumping relatively viscous liquids such as oil, the low-drag liquid possibly comprising water.

What I claim as new and desire to secure by Letters Patent of the United States is:

1. In a rotary hydraulic machine such as a Francis turbine, pump or pump-turbine, having a runner rotatably mounted within a stationary housing, at least one annular shroud attached to the blades of the runner and extending thereabout in concentric relation with the runner main axis and defining with the adjacent coaxial portion of the stationary housing an annular chamber of restricted access adapted to receive a fluid having a low drag characteristic for reducing fluid drag on the outer peripheral surface of the shroud, the improvement comprising an annular seal arrangement adjacent the high pressure edge of the shroud, including a liquid supply chamber within the adjacent stationary portion of said housing having an annular outlet therefrom in facing relation with the high pressure edge of the shroud, fluid collection means connecting with the annular shroud space, and a fluid circulation circuit extending therefrom to said fluid supply chamber, whereby low drag fluid within the annular shroud space flowing from the high pressure portion thereof to the low pressure portion thereof is recirculated, to improve the utilization of the fluid.

2. A hydraulic machine as claimed in claim 1 including pumping means in said circulation circuit, together with means for introducing additional drag reduction agent to the circulating fluid.

3. A hydraulic machine as claimed in claim 2 wherein said shroud is a skirt shroud.

4. A hydraulic machine as claimed in claim 2 wherein said shroud is a crown shroud.

5. A hydraulic machine as claimed in claim 1 having a shroud high pressure lip of sufficient axial extent to accommodate a plurality of grooves and lands to form a labyrinth seal, the outlet from said fluid supply chamber opening in facing relation therewith, being located adjacent the higher pressure portion of the seal.

6. A hydraulic machine as claimed in claim 2 including monitoring means in said circulation circuit for determining the suitability of concentration of said additive to provide effective drag reduction.

References Cited

UNITED STATES PATENTS

| 3,236,499 | 2/1966 | Chatfield et al. | 253—26 |
| 3,239,193 | 3/1966 | Kerensky | 253—26 |

FOREIGN PATENTS

| 216,193 | 8/1941 | Switzerland. |

MARTIN P. SCHWADRON, *Primary Examiner.*

E. A. POWELL, Jr., *Assistant Examiner.*